United States Patent
Voyer et al.

(10) Patent No.: US 8,185,118 B2
(45) Date of Patent: May 22, 2012

(54) METHOD FOR TRANSFERRING THE CONTEXT OF A MOBILE TERMINAL IN A WIRELESS TELECOMMUNICATION NETWORK

(75) Inventors: Nicolas Voyer, Rennes Cedex (FR); Sophie Pautonnier-Perrot, Rennes Cedex (FR); Damien Castelain, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 988 days.

(21) Appl. No.: 12/067,236

(22) PCT Filed: May 3, 2006

(86) PCT No.: PCT/EP2006/005322
§ 371 (c)(1),
(2), (4) Date: Jun. 23, 2008

(87) PCT Pub. No.: WO2007/038994
PCT Pub. Date: Apr. 12, 2007

(65) Prior Publication Data
US 2008/0280594 A1    Nov. 13, 2008

(30) Foreign Application Priority Data
Sep. 19, 2005   (EP) .................................... 05291937

(51) Int. Cl.
*H04W 36/00*   (2009.01)
*H04W 4/00*    (2009.01)
*H04M 1/725*   (2006.01)
(52) U.S. Cl. .................... 455/439; 455/412.1; 370/331; 370/338
(58) Field of Classification Search ............... 455/412.1, 455/436, 439, 441; 370/331, 328, 338
See application file for complete search history.

(56) References Cited

U.S. PATENT DOCUMENTS

| | | | | |
|---|---|---|---|---|
| 5,850,444 A * | 12/1998 | Rune | ............................... | 705/79 |
| 6,088,591 A * | 7/2000 | Trompower et al. | .......... | 455/438 |
| 6,937,860 B2 * | 8/2005 | Jahn | .............................. | 455/436 |
| 7,006,828 B1 * | 2/2006 | Czaja et al. | .................... | 455/442 |
| 7,043,249 B2 * | 5/2006 | Sayeedi | ........................ | 455/445 |
| 7,089,009 B1 * | 8/2006 | Fauconnier | ................... | 455/445 |
| 7,110,747 B2 * | 9/2006 | Jain et al. | ...................... | 455/411 |
| 7,151,931 B2 * | 12/2006 | Tsao et al. | ................. | 455/435.2 |
| 7,257,404 B1 * | 8/2007 | Chow et al. | ................... | 455/436 |

(Continued)

FOREIGN PATENT DOCUMENTS

WO    WO 00/24213    *   4/2000

(Continued)

*Primary Examiner* — Christopher M Brandt
(74) *Attorney, Agent, or Firm* — Oblon, Spivak, McClelland, Maier & Neustadt, L.L.P.

(57) ABSTRACT

The present invention concerns a method for obtaining a context of a mobile terminal (30) which is expecting to be served by a first base station (10b) of a wireless telecommunication network comprising a plurality of base stations (10) linked together by a telecommunication network. The first base station which is expected to serve the mobile terminal, receives a first message from the mobile terminal (30) through a wireless interface, the message comprising at least an identifier of the mobile terminal (30) and an identifier of a second base station (10a), transfers through the telecommunication network (50) a second message to the second base station (10a) of which the identifier is comprised in the received message, receives through the telecommunication network a third message from the second base station, the third message message comprising the context of the mobile terminal.

8 Claims, 8 Drawing Sheets

U.S. PATENT DOCUMENTS

| | | | | |
|---|---|---|---|---|
| 7,299,019 | B1* | 11/2007 | Austin et al. | 455/161.3 |
| 7,346,772 | B2* | 3/2008 | Rebo et al. | 713/155 |
| 7,630,718 | B2* | 12/2009 | Choi | 455/441 |
| 7,684,798 | B2* | 3/2010 | Sengodan et al. | 455/436 |
| 7,688,785 | B2* | 3/2010 | Bachmann et al. | 370/331 |
| 7,706,326 | B2* | 4/2010 | Marinier et al. | 370/331 |
| 7,904,088 | B2* | 3/2011 | Rexhepi et al. | 455/439 |
| 7,949,337 | B2* | 5/2011 | Choi | 455/440 |
| 2002/0018569 | A1* | 2/2002 | Panjwani et al. | 380/247 |
| 2002/0045451 | A1* | 4/2002 | Hwang et al. | 455/442 |
| 2002/0147008 | A1* | 10/2002 | Kallio | 455/426 |
| 2002/0197979 | A1 | 12/2002 | Vanderveen | |
| 2004/0018841 | A1* | 1/2004 | Trossen | 455/436 |
| 2004/0058678 | A1* | 3/2004 | deTorbal | 455/437 |
| 2004/0072563 | A1* | 4/2004 | Holcman et al. | 455/432.1 |
| 2005/0090259 | A1* | 4/2005 | Jain et al. | 455/439 |
| 2005/0122941 | A1 | 6/2005 | Wu et al. | |
| 2005/0143065 | A1 | 6/2005 | Pathan et al. | |
| 2005/0163078 | A1 | 7/2005 | Oba et al. | |
| 2006/0099950 | A1* | 5/2006 | Klein et al. | 455/439 |
| 2006/0111111 | A1* | 5/2006 | Ovadia | 455/439 |
| 2007/0037576 | A1* | 2/2007 | Subramanian et al. | 455/436 |
| 2008/0107269 | A1* | 5/2008 | Gehrmann et al. | 380/270 |

FOREIGN PATENT DOCUMENTS

| | | |
|---|---|---|
| WO | 03 100990 | 12/2003 |
| WO | 2005 027560 | 3/2005 |

* cited by examiner

METHOD FOR TRANSFERRING THE CONTEXT OF A MOBILE TERMINAL IN A WIRELESS TELECOMMUNICATION NETWORK

The present invention relates to a method for transferring the context of a mobile terminal in a wireless telecommunication network comprising a plurality of base stations linked each other by a telecommunication network.

A mobile telecommunication network, that provides telecommunication services to mobile terminals wandering inside of an area composed of multiple radio cells, typically offers means to the mobile telecommunication operators to verify that the mobile terminal has the rights to access its network before granting the associated resource.

A mobile telecommunication network is typically composed of numerous base stations connected to multiple base station controllers, themselves being connected to few VLR (Visited Location Registry) connected to at least one common HLR (Home Location Registry).

In such network, the information related to an authorised mobile terminal, so called the context of a mobile terminal, are stored in the mobile terminal and the HLR. By comparing the information stored in the mobile terminal and the information stored in the HLR, one can authenticate the mobile terminal. Based on these information, the mobile telecommunication network grants or not an access to the mobile terminal. Such centralized authentication, generates some latency in the authentication process.

In order to reduce the latency, the concept of VLR has been introduced so as to minimise the number of accesses to the HLR, that deals with a huge number of mobile terminals, and would typically not stand the large signalling required for the access granting of all the mobile terminals of the whole network. The VLR can be viewed as achieving a delegation of HLR functions, and more specifically deals with HLR functions for all mobile terminals located in its area of influence. To do so, VLR and HLR accomplish a delegation of competence, so that the access grant can sometimes be decided by the VLR autonomously.

Such hierarchical architecture still generates some latency in the authentication process, because the base station has to relay the authentication requests from the mobile terminal to the VLR, and the VLR has to process the requests of many mobile terminals in parallel.

In order to reduce latency, one could delegate the authentication process to the base stations, but such solution is not acceptable because it is not compatible with the notion of fast mobility. Each time a mobile terminal would move from one cell of a base station to the cell of another base station, the access grant should be renegotiated between the mobile terminal and the other base station. The other base station, being unaware of the mobile terminal context, would ask such information to the HLR, which would result in a significant increase in signalling to be dealt by the HLR. The signalling time for exchanging the mobile terminal context would be so long that it would not permit in practice the efficient realisation of cell reselection functions for fast moving mobile terminals in the sense that the mobile terminal may have moved to another cell controlled by another base station before that the mobile terminal context is received.

For the reasons mentioned above, one can see that efficient cell reselection is restricted in the current technology within cells controlled by one VLR, and that mobility across areas served by different VLR is not satisfactory.

The access points of wireless local area networks like the one disclosed in the standard IEEE 802.11 contain some access control mechanisms, where the Radius server can be located inside the access point itself. But such wireless local area networks do not propose any practical scheme that can preserve a fast access grant and fast and efficient cell reselection between neighbours wireless local area networks.

New generation of mobile telecommunication networks, like the third generation of cellular networks, provide high data rate transmission but the latency in the authentication process has not been improved.

Furthermore, new mobile telecommunication networks propose many services with different quality of services. Each time a handover is made, the new serving base station has to set up the communication parameters to be used by the radio interface and the fixed network interface to carry this communication context. The communication parameters can be manifold, for instance a code number, a frequency, a time slot, a data format, communication ports, etc. . . . These communication parameters are derived by the base station from higher level parameters of the communication context, like the quality of service. For that, the new serving base station has to get, during the handover procedure, the higher level parameters of the communication context from either the mobile terminal or from the old serving base station, and then from this information, the new serving base station should derive the communication parameters. The transfer of such information related to the mobile terminal slows down the handover procedure. Also, the process of deriving the communication parameters from the high level parameters of the communication context is slow, and may involve additional signalling procedures. The aggregated time for exchanging the mobile terminal information and for deriving the communication parameters would be so long that it would not permit in practice the efficient realisation of handover functions for fast moving mobile terminals in the sense that the mobile terminal may have moved to another cell controlled by another base station before that the information related to the mobile terminal are received or before the communication parameters are derived.

The aim of the invention is therefore to propose a method and a device which make it possible to narrow down the latency in the mobility process like a cell reselection process or a handover procedure.

To that end, the present invention concerns a method for obtaining a context of a mobile terminal which is expecting to be served by a first base station of a wireless telecommunication network comprising a plurality of base stations linked together by a telecommunication network, characterised in that the method comprises the steps, executed by the first base station which is expected to serve the mobile terminal, of:
  receiving a first message from the mobile terminal through a wireless interface, the message comprising at least an identifier of the mobile terminal and at least an identifier of a second base station,
  transferring through the telecommunication network a second message comprising at least one identifier comprised in the received message,
  receiving through the telecommunication network the context of the mobile terminal.

The present invention concerns also a device for obtaining a context of a mobile terminal which is expecting to be served by a first base station of a wireless telecommunication network comprising a plurality of base stations linked together by a telecommunication network, characterised in that the device is comprised in the first base station which is expected to serve the mobile terminal, and comprises:
  means for receiving a first message from the mobile terminal through a wireless interface, the message comprising at least an identifier of the mobile terminal and at least an identifier of a second base station, means for transferring through the telecommunication network a second message comprising at least one identifier is comprised the received message, means for receiving through the telecommunication network a third message from the second base station, the third message comprising the context of the mobile terminal.

Thus, it is possible to reduce the latency of a mobility process like a cell reselection process or of a handover procedure.

If the mobile terminal, which is in idle mode, moves from one cell of a base station to a cell of another base station, the other base station can get the context of the mobile terminal for an authentication procedure without needing to proceed as it is disclosed in the state of the art. The HLR and VLR procedure for authentication is no more always required, the other base station can proceed, by itself, the authentication procedure, and then enables a fast cell reselection process.

Thus, the HLR and VLR can treat a reduced number of messages, and their complexity is decreased.

If a mobile terminal, which is in communication mode, moves from one cell of a base station to a cell of another base station, the handover procedure is also shortened.

According to a particular feature, the second base station is the base station which is serving the mobile terminal.

Thus, as a cell reselection process occurs among neighbouring base stations, the context is transferred in a short distance. This can also reduce the latency of the execution of the cell selection or the execution of a handover procedure.

According to a first mode of realisation of the present invention, the second message is transferred to the second base station and comprises at least the identifier of the second base station, the identifier of the mobile terminal and the context of the mobile terminal is received in a third message.

Thus, the latency of the execution of the cell selection or the execution of a handover procedure is reduced.

According to a particular feature, the first message comprises a certificate which comprises the identifier of the mobile terminal, the identifier of the second base station and a signature obtained by encoding the identifiers by the private key of the second base station and/or a signature obtained by encoding the identifiers by the private key of the mobile terminal. Prior to transfer the second message, the first base station which is expected to serve the mobile terminal checks if the certificate is corrupted.

Thus, the first base station can identify the second base station, which is currently serving the mobile terminal, and send a request to the second base station in order to get the context of the identified mobile terminal.

The first base station can refuse to send a request to the second base station in order to get the context of the identified mobile terminal if the certificate is corrupted. Only mobile terminals which have access rights guaranteed by the second base station can realise a cell reselection of handover with the first base station. This can protect the wireless cellular network of undesired signalling flows across base stations associated to malicious mobiles that have no access rights.

Furthermore, the time to verify the access rights of a mobile terminal to access the network via the first base station is shortened.

According to a particular feature, the first base station which is expected to serve the mobile terminal, once the third message is received, starts to serve the mobile terminal and transfers to the mobile terminal at least an identifier of the first base station and an identifier of the mobile terminal.

Thus, the mobile terminal can store this identifier of the first base station, and is ready to send it to a third base station if another cell reselection or handover procedure occurs. Therefore, the latency of an authentication procedure is reduced.

According to a particular feature, when the first base station, which is expected to serve the mobile terminal, starts to serve the mobile terminal, the first base station receives through the telecommunication network a fourth message from a third base station, the message comprising at least the identifier of the base station which serves the mobile terminal and the identifier of the mobile terminal, transfers through the telecommunication network a fifth message to the third base station, the fifth message comprising the context of the mobile terminal, and the first base station stops to serve the mobile terminal.

Thus, the first base station can identify the context associated to the mobile terminal, prior to sending the context to the third base station.

The context of the mobile terminal is then transferred to the third base station which is expected to serve the mobile terminal.

According to a particular feature, the fourth message comprises a certificate which comprises the identifier of the mobile terminal, the identifier of the first base station and a signature obtained by encoding the identifiers by the private key of the first base station and/or a signature obtained by encoding the identifiers by the private key of the mobile terminal.

Thus, first base station can trust that it was dealing with the context of the mobile terminal.

Thus, first base station can trust that the third base station is not attempting to delete its contexts for undue reason, for instance by reusing an old certificate emitted previously by a fourth base station.

According to a second mode of realisation of the invention, the first message comprises at least another identifier of a third base station selected by the mobile terminal.

Thus it is possible to determine the path used by the mobile terminal to move between first and second base stations.

According to a particular feature of the second mode of realisation, the second message is transferred to the third base station selected by the mobile terminal and the second message comprises at least the identifiers received in the first message.

Thus, even if the first and second base stations are not connected, the first base station knows a third base station which is susceptible to be connected to the second base station.

According to a particular feature of the second mode of realisation, the identifiers of the base stations are transferred in a list ordered according to order of which the mobile terminal has selected the base stations.

Thus it is possible to determine precisely the history of the path used by the mobile terminal to move from first base station to second base station.

According to a particular feature of the second mode of realisation, plural identifiers of third base stations are comprised in the first message and the first base station determines to which third base station the second message has to be transferred and transfers the second message to the determined third base station.

Thus, the latency is reduced.

According to a particular feature of the second mode of realisation, the first base station determines the third base station to which the second message has to be transferred is determined according to the order of the identifiers of base stations in the list.

According to a particular feature of the second mode of realisation, the first message comprises a certificate which comprises the identifier of the mobile terminal, identifiers of the base stations and a signature obtained by encoding the identifiers by the private key of the second base station and/or a signature obtained by encoding the identifiers by the private key of the mobile terminal and prior to transfer the second message, the first base station which is expected to serve the mobile terminal checks if the certificate is corrupted.

Thus, the first base station can refuse to request the context if the certificate is corrupted.

According to a particular feature of the second mode of realisation, the second message comprises a certificate which comprises the identifiers of the mobile terminal, the identifier of the base stations and a signature obtained by encoding the identifiers by the private key of the second base station and/or a signature obtained by encoding the identifiers by the private key of the mobile terminal.

Thus, the second base station can refuse to send the context if the certificate is corrupted.

According to a particular feature of the second mode of realisation, once the context is received in a third message, the first base station starts to serve the mobile terminal and transfers to the mobile terminal at least an identifier of the first base station and an identifier of the mobile terminal.

According to a particular feature of the second mode of realisation, once the first base station which is expected to serve the mobile terminal starts to serve the mobile terminal, of, the first base station receives through the telecommunication network a fourth message from a fourth base station, the message comprising at least the identifier of the first base station which serves the mobile terminal and the identifier of the mobile terminal, transfers through the telecommunication network a fifth message to a fifth base station, the fifth message comprising the context of the mobile terminal and the first base station stops to serve the mobile terminal.

According to a particular feature of the second mode of realisation, the fourth message comprises plural identifiers of fifth base stations and the first base station determines to which fifth base station the message has to be transferred and transfers the fifth message to the determined fifth base station.

According to a particular feature of the second mode of realisation, the fifth base station to which the second message has to be transferred is determined according to the order of the identifiers of base stations in the list.

The present invention concerns also a method for requesting a base station to serve a mobile terminal, the base station being a base station of a wireless telecommunication network, the mobile terminal being served by another base station of the wireless telecommunication network, characterised the method comprises the steps, executed by the mobile terminal which requests to be served by the base station, of:
  receiving from the base station the mobile terminal is currently being served, a first message comprising at least an identifier of the base station the mobile terminal is currently being served and an identifier of the mobile terminal,
  transferring to the base station the mobile terminal requests to be served by, a second message comprising at least the identifier of the base station the mobile terminal is currently being served and the identifier of the mobile terminal.

The present invention concerns also a device for requesting a base station to serve a mobile terminal, the base station being a base station of a wireless telecommunication network, the mobile terminal being served by another base station of the wireless telecommunication network, characterised the device is comprised in the mobile terminal which requests to be served by the base station, and comprises:
  means for receiving from the base station the mobile terminal is currently being served at least an identifier of the base station the mobile terminal is currently being served and an identifier of the mobile terminal,
  means for transferring to the base station the mobile terminal requests to be served by, a message comprising at least the identifier of the base station the mobile terminal is currently being served and the identifier of the mobile terminal.

Thus, the base station which is requested to be served by the mobile terminal can send a request to the base station the mobile terminal is currently being served, in order to get the information which are necessary to serve the mobile terminal by the base station which is requested to be served by the mobile terminal. The base station which is requested to be served by the mobile terminal needs not send such a request to the server, reducing the delay to serve the mobile terminal.

According to a particular feature, the first message comprises a certificate which comprises the identifier of the mobile terminal, the identifier of the base station and a signature obtained by encoding the identifiers by the private key of the base station the mobile terminal is currently being served.

Thus, by checking the integrity of the certificate, the base station which is requested to serve the mobile terminal can verify autonomously, that the mobile terminal possess the access rights to be served by it. Corrupted certificates can be discarded, saving the capacity of the wireless cellular network.

According to a particular feature, the second message comprises a certificate which comprises the identifier of the mobile terminal, the identifier of the base station and a signature obtained by encoding the identifiers by the private key of the other base station and/or a signature obtained by encoding the identifiers by the private key of the mobile terminal.

Thus, by checking the integrity of the certificate, the base station the mobile terminal is currently being served can verify autonomously that the base station the mobile terminal requests to be served by possesses the rights to deal with the mobile terminal context. Corrupted certificates can be discarded, saving the capacity of the cellular mobile network.

According to a particular feature of the second mode of realisation, the mobile terminal selects third base stations, memorises the identifiers of the selected base stations and the second message comprises the identifiers of the base stations ordered according to the order of which the mobile terminal has selected the base stations.

According to a particular feature of the second mode of realisation, the mobile terminal is configured in a first state wherein the transfer of signals is interrupted and the third base stations are selected when the mobile terminal is configured in the state wherein the transfer of signals is interrupted.

Thus, the electric power resources of the mobile terminal are saved.

According to a particular feature of the second mode of realisation, the mobile terminal determines the number of selected third base stations and configures the mobile terminal in a second state wherein the transfer of signals is enabled if the determined number is equal to a predetermined value.

Thus, the electric power resources of the mobile terminal are saved.

According to a particular feature of the second mode of realisation, the second message is transferred once the mobile terminal is configured in the second state.

The present invention concerns also a message transferred in a wireless cellular network composed of plural base stations linked each other by a telecommunication network, one base station being currently serving a mobile terminal, characterized in that the message comprises at least an identifier of the mobile terminal and an identifier of the base station which is currently serving the mobile terminal.

According to a particular feature, the message further comprises an ordered list of identifiers of base stations selected by the mobile terminal.

According to a particular feature, the message is transferred between the mobile terminal and anther base station which is expected to serve the mobile terminal.

According to a particular feature, the first message comprises a certificate which comprises the identifier of the mobile terminal, the identifier of the base station which is currently serving the mobile terminal and a signature obtained by encoding the identifiers by the private key of the base station which is currently serving the mobile terminal and/or a signature obtained by encoding the identifiers by the private key of the mobile terminal.

Since the features and advantages relating to the messages are the same as those set out above related to the method and device according to the invention, they will not be repeated here.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 5A:
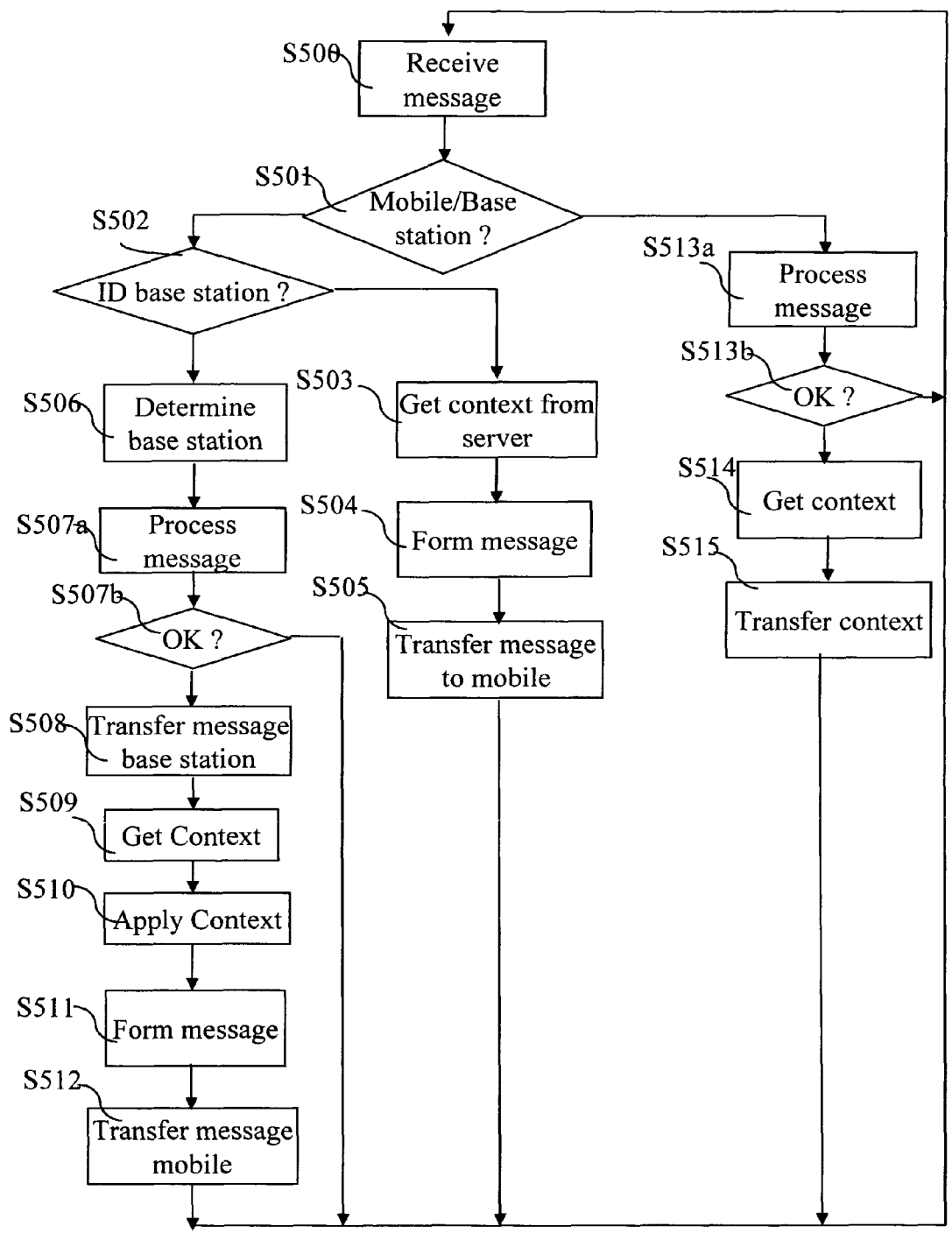
FIG. 5a is an algorithm executed by a base station according to a first mode of realisation of the present invention.
Figure 5B:
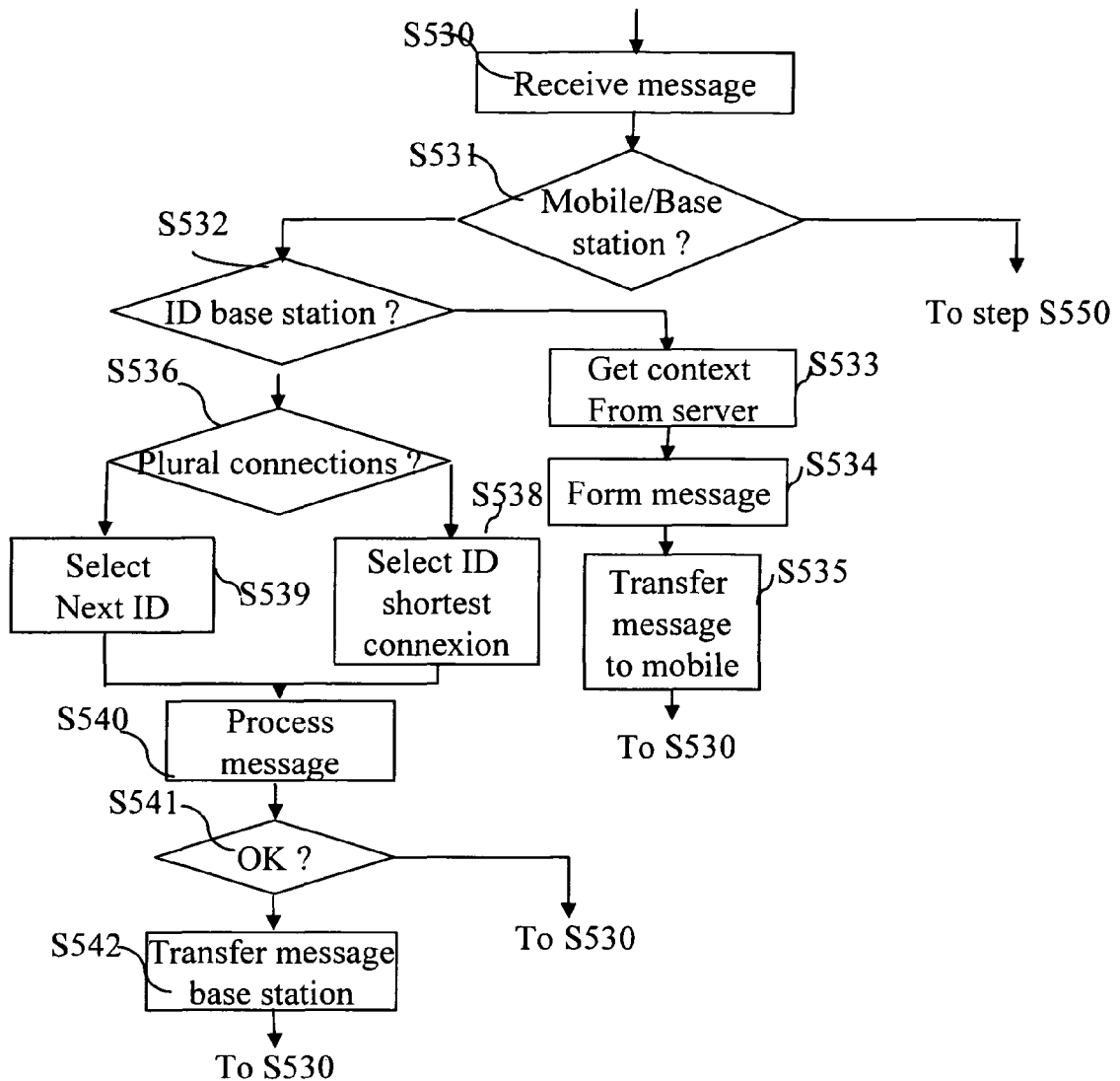
Figure 5C:
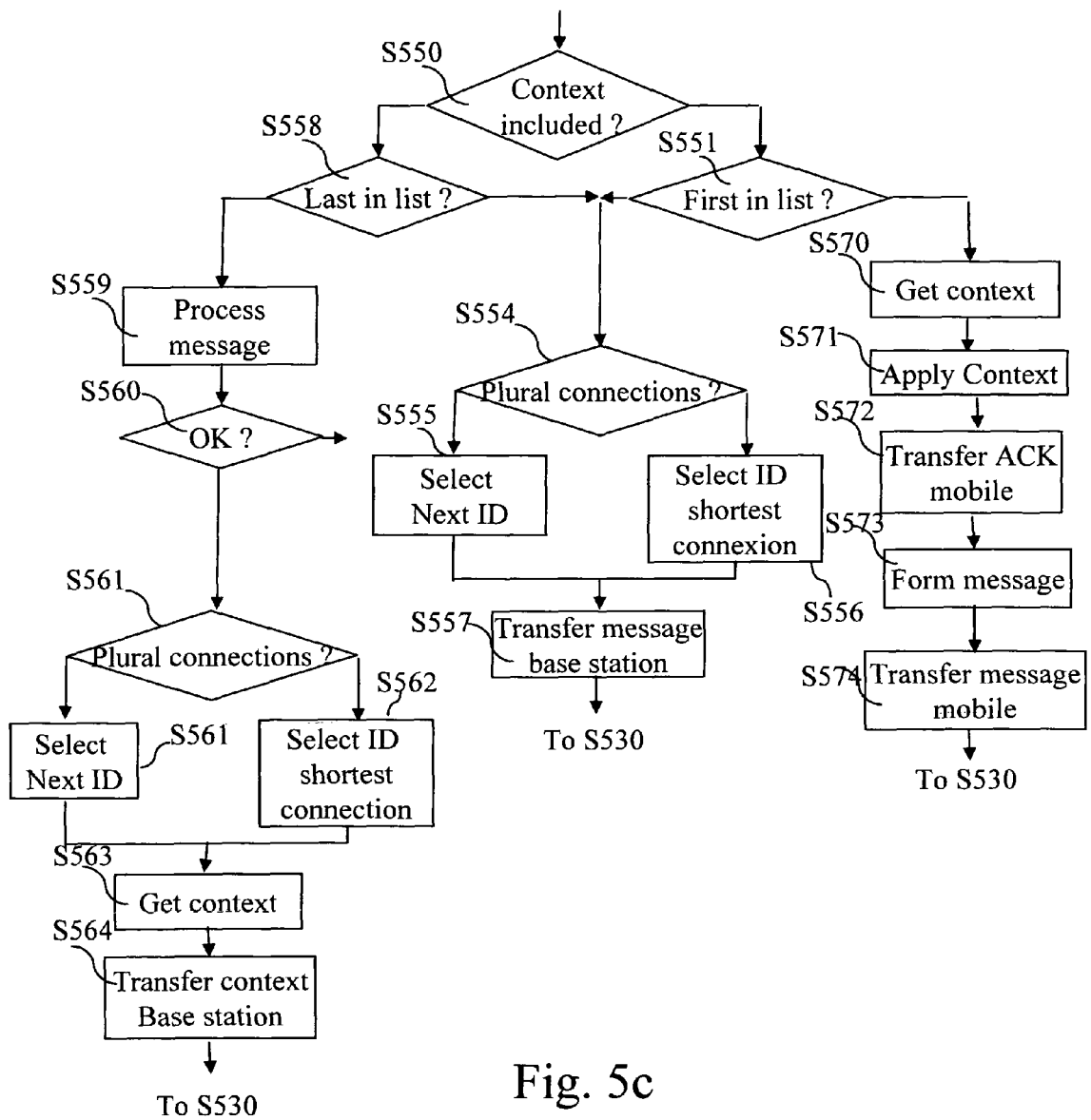

FIGS. 5b and 5c disclose an algorithm executed by a base station according to a second mode of realisation of the present invention.

Figure 1A:
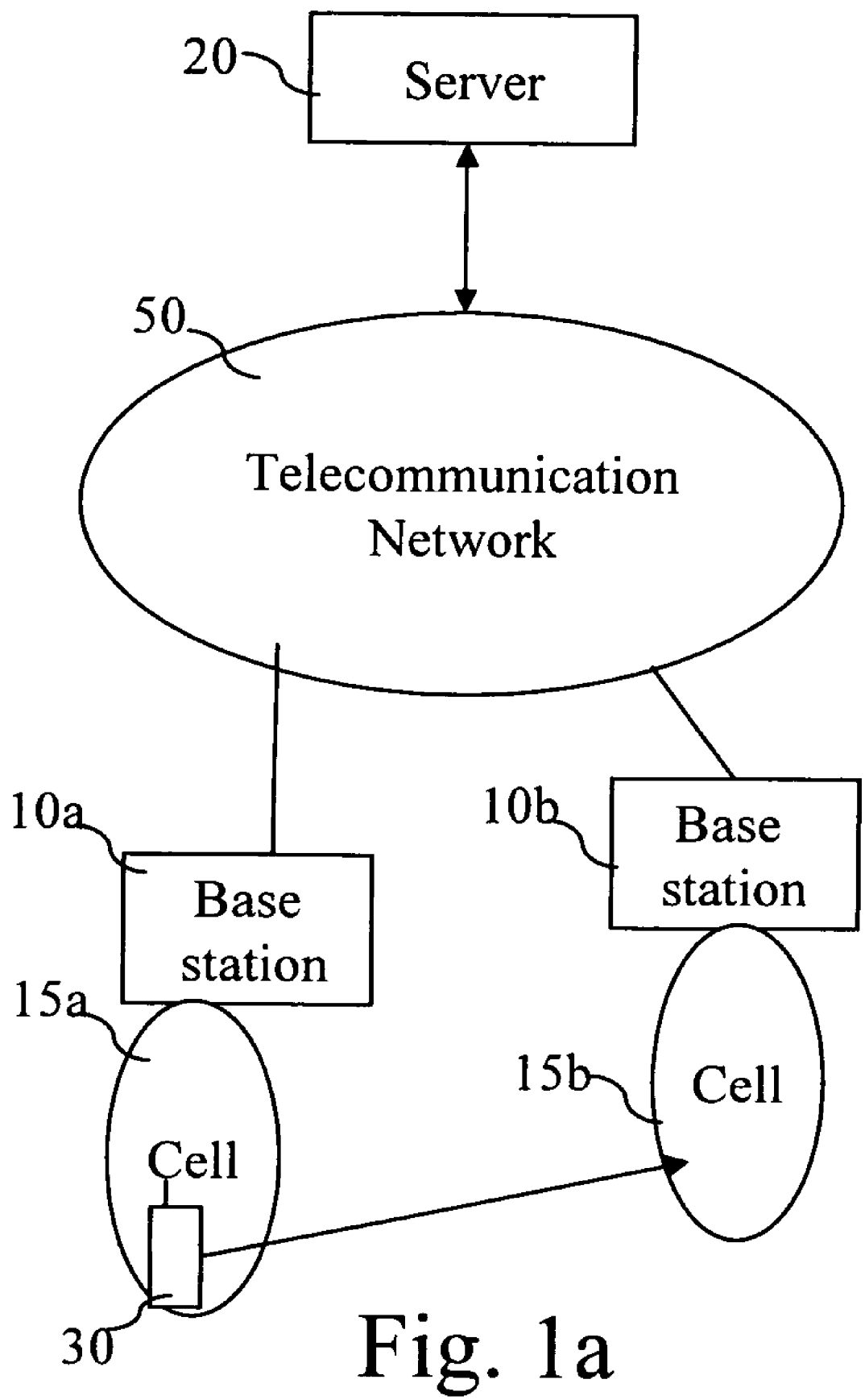
FIG. 1a is a first diagram representing the architecture of a mobile telecommunication network according to the present invention.

FIG. 1a is a first diagram representing the architecture of a mobile telecommunication network according to the present invention.

In the mobile telecommunication network, a server 20 is connected to a plurality of base stations 10a and 10b through a telecommunication network 50. The telecommunication network 50 is a dedicated wired network or a public network like a public switched network or an IP based network or a wireless network or an Asynchronous Transfer Mode network or a combination of above cited networks.

The telecommunication network 50 connects the base stations 10 together and enables the transfer of messages and of information between the base stations 10 or between the base stations 10 and the server 20 according to the present invention.

The server 20 stores the information related to each mobile terminal 30 of the mobile telecommunication network and when a base station 10 requests the context about an unknown mobile terminal 30, the server 20 creates a context from the stored information related to that mobile terminal 30, and transfers the context of the mobile terminal 30 to the base station 10 through the telecommunication network 50.

Each base station 10 is able to transfer and or receive data through a wireless area 15. Such wireless area will be called hereinafter a cell 15.

In the FIG. 1a, only one server 20 is shown, but we can understand that a more important number of servers 20 can be used in the present invention. On a similar way, only two base stations 10a and 10b and their respective cells 15a and 15b are shown, but we can understand that a more important number of base stations 10 and cells 15 are used in the present invention.

In the FIG. 1a, a mobile terminal 30 is shown. The mobile terminal 30 is served by the base station 10a and moves from the cell 15a of the base station 10a to the cell 15b of the base station 10b.

A mobile terminal 30 is served by a base station 10, or a base station 10 serves a mobile terminal 30, if the mobile terminal 30 can establish or receive or continue a communication through the base station 10.

A cell reselection process occurs when a mobile terminal 30 is in idle mode and moves from one cell to a neighbouring cell as example from the cell 15a to the cell 15b. A mobile terminal 30 is in an idle mode when it is not in communication with another telecommunication device, but yet a context exists in the base station 10 that serves the mobile terminal 30. When a mobile terminal 30 is in the idle mode, it has to continuously reselect the best cell 15 in case a communication has to be established. Such process is the cell reselection process.

During a cell reselection process, the context of the mobile terminal 30 is, as example, data used to authenticate the mobile terminal 30 and to check its access rights, data used later, when a communication is established with the mobile terminal 30 like an encryption key, the details of the service access contract of the mobile terminal 30. A base station 10 uses the context of a mobile terminal 30 in order to register the mobile terminal 30 as a mobile terminal 30 which is present in its cell 15 and as a terminal the base station 10 serves.

A handover procedure occurs when a mobile terminal 30 is in communication with another telecommunication device through a given cell 15 of a given base station 10 and moves to a neighbouring cell 15 of a base station 10. During the handover procedure, the given base station 10 has to stop to serve the mobile terminal 30 and the neighbouring base station 10 has to start to serve the mobile terminal 30 enabling the continuation of the communication. During a soft handover procedure, the neighbouring base station 10 has to start to serve the mobile terminal 30, while the given base station 10 keeps serving the mobile terminal 30, enabling macro-diversity, the simultaneous continuation of the communication over multiple cells.

During a handover procedure, the context of a mobile terminal 30 is needed for the target base station 10 to configure its wireless interface and its network interface so as to connect the mobile terminal 30 to the telecommunication network 50 and provide a relay of the information flow in the handover.

More precisely, the context of a mobile terminal 30 involved in a handover procedure comprises, as example, the public key of the mobile terminal 30 in asymmetric encryption/authentication systems, the secret encryption/decryption key in symmetric flow encryption systems, the quality of service information, defining the flow of communication, in terms of average and peak data rates, the granularity, the time/latency constraints for the communication context of the mobile terminal 30, the reference of entry port of the network interface which has to be used for routing the communication from/to the mobile terminal 30 to the telecommunication network 50.

Such information are used to setup the wireless interface and the network interface. Once set up, the wireless interface is ready to synchronise with the mobile terminal 30, and a handover procedure is completed once the mobile terminal 30, informed of the wireless interface configuration, accomplishes the synchronisation on the wireless interface.

The base station 10 has to setup both wireless interface and the network interface. For instance, the base station 10 decides on which frequency/time slot/code it should operate, which can noticeably depend on the quality of service parameters, such as the average peak rate, to provide to the mobile terminal 30. The base station 10 also checks the availability of hardware and software resources, at both wireless and network interfaces, and setup a connection between hardware and software resource.

According to the invention, each mobile terminal 30 served by a base station 10 receives from that base station 10, the identifier of the base station 10. When a cell reselection process, or an handover procedure occurs, the mobile terminal 30 transfers to the base station 10 it expects to be served by, the identifier of the base station 10 it is currently being served. The base station 10 which is expected to serve the mobile terminal 30 gets from the base station 10 which is currently serving the mobile terminal 30, the context of the mobile terminal 30.

In the FIG. 1a, only one mobile terminal 30 is shown but we can understand that the present wireless network manages a lot of mobile terminals 30.

Figure 1B:
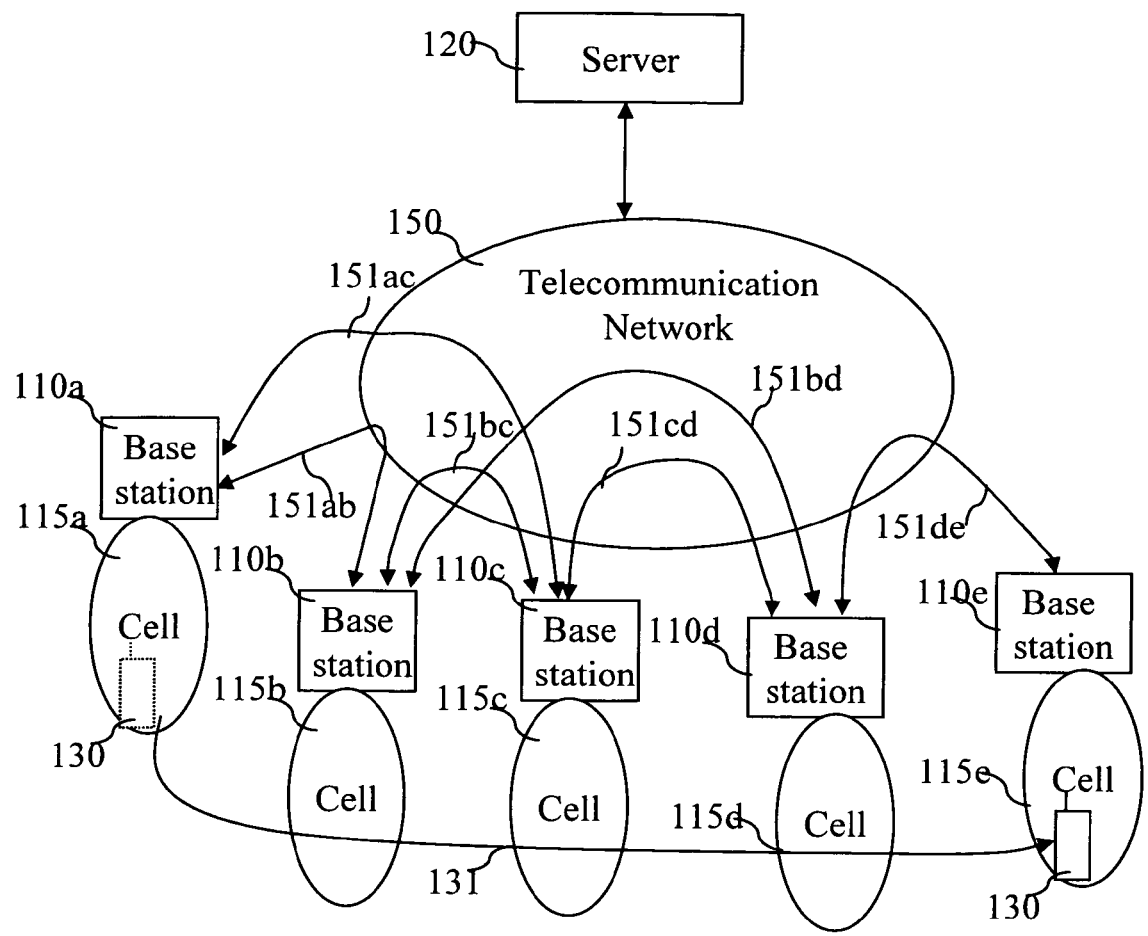
FIG. 1b is a second diagram representing the architecture of the mobile telecommunication network according to the present invention.

FIG. 1b is a second diagram representing the architecture of the mobile telecommunication network according to the present invention.

In the mobile telecommunication network, a server 120 is connected to a plurality of base stations 110a to 110e through a telecommunication network 150. The telecommunication network 150 is a dedicated wired network or a public network like a public switched network or an IP based network or a wireless network or an Asynchronous Transfer Mode network or a combination of above cited networks.

The telecommunication network 150 connects some base stations 110 through connections together and enables the transfer of messages and of information between the connected base stations 110 or between the base stations 110 and the server 120.

As example and in a non limitative way, a connection 151ab is established between the base station 110a and the base station 110b, a connection 151ac is established between the base station 110a and the base station 110c, a connection 151bc is established between the base station 110b and the base station 110c, a connection 151bd is established between the base station 110b and the base station 110c, a connection 151cd is established between the base station 110c and the base station 110d, and a connection 151de is established between the base station 110d and the base station 110e.

The server 120 is identical to the server 20, it will not be described anymore.

Each base station 110 is able to transfer and or receive data through a wireless area 115. Such wireless area will be called hereinafter a cell 115.

In the FIG. 1b, only one server 120 is shown, but we can understand that a more important number of servers 120 can be used in the present invention. On a similar way, only five base stations 110a to 110e and their respective cells 115a to 115e are shown, but we can understand that a more important number of base stations 110 and cells 115 are used in the present invention.

In the FIG. 1b, a mobile terminal 130 is shown. The mobile terminal 130 is served by the base station 110a and moves from the cell 115a of the base station 110a to the cell 115e of the base station 110e through the cell 115b of the base station 110b, the cell 115c of the base station 110c and the cell 115d of the base station 110d. Such displacement is depicted in the FIG. 1b by the arrow noted 131.

A mobile terminal 130 is served by a base station 110, or a base station 110 serves a mobile terminal 130, if the mobile terminal 130 can establish or receive or continue a communication through the base station 110.

When a base station 110 serves the mobile terminal 130, the base station 110 holds a context associated to the mobile terminal 130. As example, the base station 110a is serving the mobile terminal 130.

When the mobile terminal 130 is in an active mode, a communication can be established with the mobile terminal 130 and data can be transferred and/or received to and/or with a base station 110.

When the mobile terminal 130 is in active mode, and when there is no data transferred in the established communication, the mobile terminal 130 can switch to a dormant state, where the mobile terminal 130 stops radio transmission in order to save its electric power energy. In a dormant state, the mobile terminal 130 continues to measure the levels of received signals, selects new base stations 110, memorises the identifiers of the base stations it selects but triggers no signalling with these base stations 110.

As example, if the mobile terminal 130 is in dormant state when it moves through the cells 115b to 115d, it is not served by the base stations 110b to 110d. The base stations 110b to 110d don't have the context of the mobile terminal 130. The mobile terminal 130 memorizes the identifiers of the base stations 110b to 110d.

The mobile terminal 130 is able to execute cell reselection processes or handovers as it has been disclosed for the mobile terminal 30 in reference to the FIG. 1a.

The context of the mobile terminal 130 is identical as the one disclosed for the mobile terminal 30 in reference to the FIG. 1a.

The base stations 110 uses the context of the mobile terminal 130 on the same way as it has been disclosed for the base station 10 in reference to the FIG. 1a.

Figure 2:
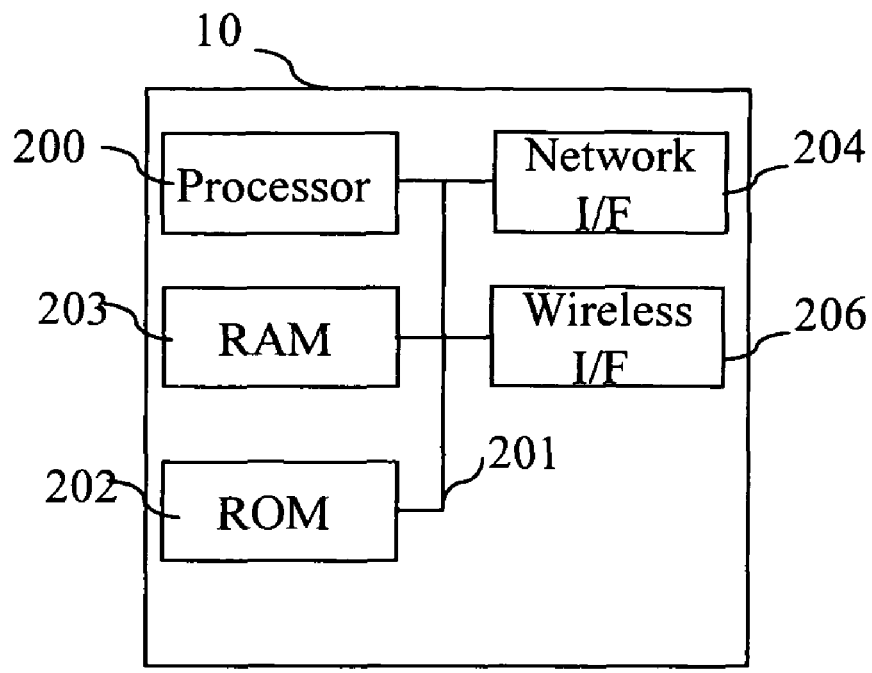
FIG. 2 is a block diagram of a base station according to the present invention.

FIG. 2 is a block diagram of a base station according to the present invention.

The base station 10 has, for example, an architecture based on components connected together by a bus 201 and a processor 200 controlled by the program as disclosed in the FIG. 5a.

The bus 201 links the processor 200 to a read only memory ROM 202, a random access memory RAM 203, a network interface 204 and a wireless interface 206.

The memory 203 contains registers intended to receive variables, the identifiers of some base stations 10, the content of the messages transferred by the mobile terminal 30 or by other base stations 10 or by the server 20, the context of the mobile terminals 30 being served by the base station 10 and the instructions of the program related to the algorithm as disclosed in the FIG. 5a.

The processor 200 controls the operation of the network interface 204 and the wireless interface 206.

The read only memory 202, contains instructions of the programs related to the algorithm as disclosed in the FIG. 5a, which are transferred, when the base station 10 is powered on to the random access memory 203.

The base station 10 is connected to the telecommunication network 50 through the network interface 204. As example, the network interface 204 is a DSL (Digital Subscriber Line) modem, or an ISDN (Integrated Services Digital Network) interface, etc. Through such interface, the base station 10 exchanges information which the server 20 and the other base stations 10 of the wireless cellular telecommunication network. The communications established or received by the mobile terminals 30 comprised in the cell 15 of the base station 10 go through the network interface 204 and the wireless interface 206.

Through the wireless interface 206, the base station 10 receives from a mobile terminal 30 which expects to be served by the base station 10, at least the identifier of the base station 10 which is currently serving that mobile terminal 30.

The base stations 110 are identical to the base stations 10. Each base station 110 has, for example, an architecture based on components connected together by a bus 201 and a processor 200 controlled by the programs as disclosed in the FIGS. 5b and 5c.

Figure 3:
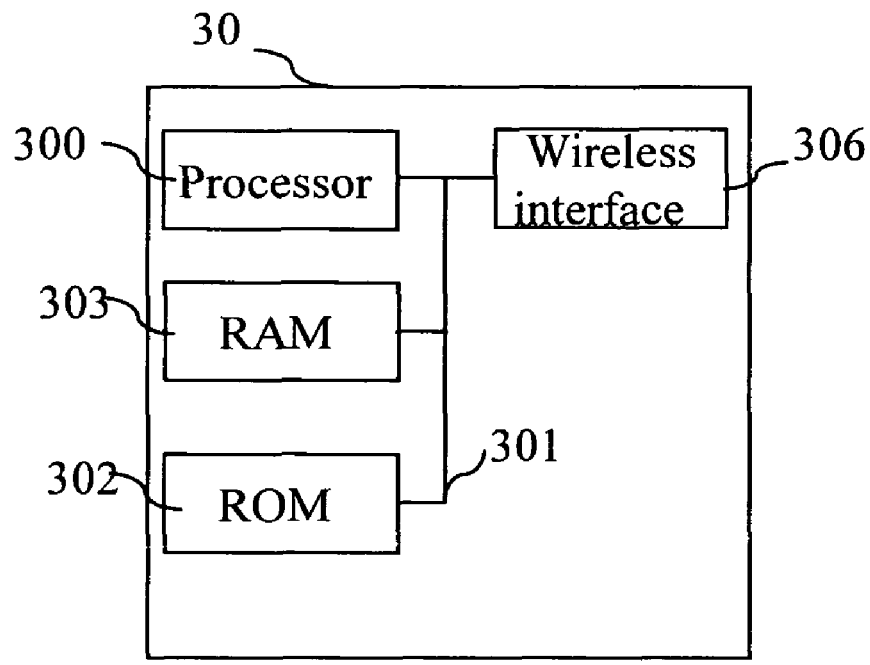
FIG. 3 is a block diagram of a mobile terminal according to the present invention.

FIG. 3 is a block diagram of a mobile terminal according to the present invention.

Figure 4A:
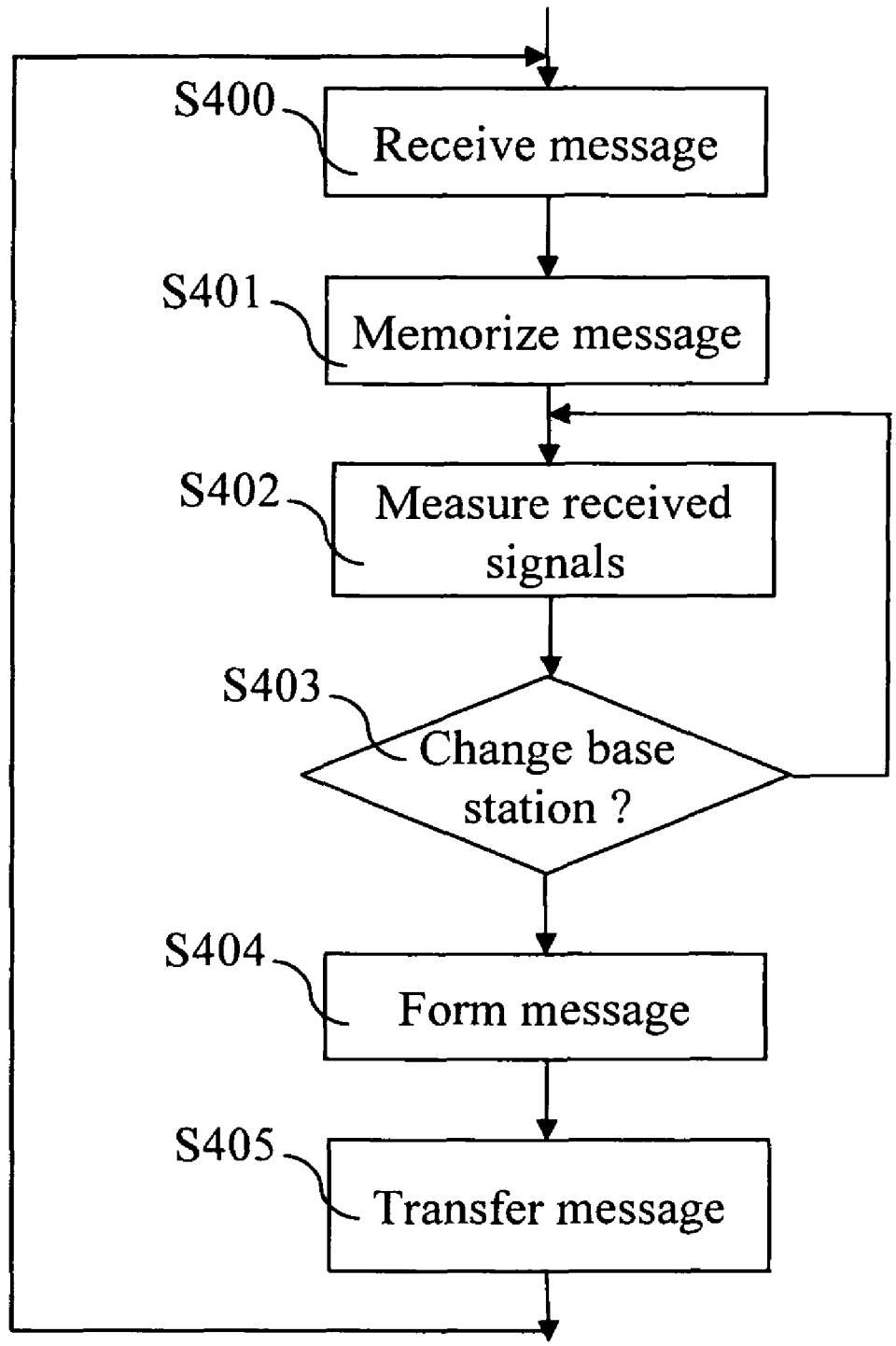
FIG. 4a is an algorithm executed by a mobile terminal according to a first mode of realisation of the present invention.

The mobile terminal 30 has, for example, an architecture based on components connected together by a bus 301 and a processor 300 controlled by the program as disclosed in the FIG. 4a.

The bus 301 links the processor 300 to a read only memory ROM 302, a random access memory RAM 303 and a wireless interface 306.

The memory 303 contains registers intended to receive variables, the identifiers of the base station 10 which is currently serving the mobile terminal 30, the content of the messages received from the base station 10 which is currently serving the mobile terminal 30 and the instructions of the program related to the algorithm as disclosed in the FIG. 4a.

The processor 300 controls the operation of the network interface 304 and the wireless interface 306.

The read only memory 302, contains instructions of the programs related to the algorithm as disclosed in the FIG. 4, which are transferred, when the base station 10 is powered on to the random access memory 303.

Through the wireless interface 306, the mobile terminal 30 establishes or receives some communications with other telecommunication devices via the base station 10 which serves it, measures the power strength of the signals transferred by the base stations 10 which are located in its vicinity, receives messages from the base station 10 it is served by or transfers message to the base station 10 the mobile terminal 30 expects to be served by.

The mobile terminal 130 is identical to the mobile terminal 30. The mobile terminal 130 has, for example, an architecture based on components connected together by a bus 301 and a processor 300 controlled by the program as disclosed in the FIG. 4b.

FIG. 4a is an algorithm executed by a mobile terminal according to a first mode of realisation of the present invention.

The present algorithm is executed by each mobile terminal 30, more precisely by the processor 300 of the mobile terminal 30 once the mobile terminal 30 has transferred a cell update message to a base station 10.

At step S400, the processor 300 detects, through the wireless interface 306, the reception of a message transferred by the base station 10 it is served. As it is shown buy an arrow in the FIG. 1a, the mobile terminal 30 is moving from the cell 15a to the cell 15b. The base station 10a is serving the mobile terminal 30 and the base station 10b is expected to serve the mobile terminal 30.

Such message comprises at least an identifier of the base station 10 which enables at least other base stations 10 located in the vicinity of the base station 10 which is currently serving the mobile terminal 30, to identify uniquely the base station 10 which is currently serving the mobile terminal 30, and the unique identifier of the mobile terminal 30. Such message comprises preferably a certificate.

A certificate comprises at least the unique identifier of the mobile terminal 30, the identifier of the base station 10 which is currently serving the mobile terminal 30, and a signature obtained by encoding these identifiers by the private key of the base station 10 which is currently serving the mobile terminal 30. The public key of the base station 10, associated to that private key can be used, together with the content of the certificate, to guarantee the integrity of the content of the certificate, and to authenticate the base station 10 which is currently serving the mobile terminal 30. The nature of private and public keys, the signature generation, the integrity detection, and the source authentication scheme can be taken, for instance, to comply with RSA authentication algorithm.

At next step S401, the processor 300 memorizes the content of the received message in the RAM memory 303.

At next step S402, the processor 300 generates a command signal to the wireless interface 306 in order to proceed to a measure of the power strength of the pilot signals transferred by the base stations 10 which are located in its vicinity. According to the FIG. 1a, wherein two base stations 10a and 10b are shown, the wireless interface 306 measures the power strength of the pilot signals transferred in the cells 15a and 15b of the base stations 10a and 10b.

At next step S403, the processor 300 decides whether or not it has to change of cell 15. According to our example, if the power strength of the pilot signals transferred in the cell 15b of the base station 10b is upper than a given threshold, or a given ratio of the power strength of the pilot signals transferred in the cell 15a of the base station 10a which is currently serving the mobile terminal 30, the processor 300 decides to change of cell 15, i.e. it expects to be served by the base station 10 that controls the cell 15b. In that case, the processor 300 moves to step S404.

If the power strength of the pilot signals transferred in the cells of other base stations 10 are lower than a given threshold or a given ratio of the power strength of the pilot signals transferred in the cell 15 of the base station 10 which is currently serving the mobile terminal 30, the processor 300 returns to the step S402 already described.

At step S404, the processor 300 forms a message comprising the content of the message memorized at step S401.

According to a variant of realization of the present invention, the processor 300 forms a certificate which comprises at least the unique identifier of the mobile terminal 30, the public key of the mobile terminal 30, the identifier of the base station 10 which is currently serving the mobile terminal 30, the signature of the base station obtained by encoding these identifiers by the private key of the base station 10 which is currently serving the mobile terminal 30 and the signature of the mobile terminal 30 obtained by encoding these identifiers by the private key of the mobile terminal 30.

It has to be noted here that, the signature of the base station 10 which is currently serving the mobile terminal 30 can also not be comprised in the formed message.

According to another variant of realisation, the formed message is encrypted with the public key of the base station 10 the mobile terminal 30 expects to be served by.

At next step S405, the processor 300 transfers the formed message to the base station 10 it expects to be served by.

It has to be noted here that each base station 10 of the wireless telecommunication network broadcast signals comprising information enabling mobile terminals 30 to sent it a message. The mobile terminal 30 uses such information for the transfer of the message to the base station 10 it expects to be served by.

The processor 300 then, returns to step S400 already described.

Figure 4B:
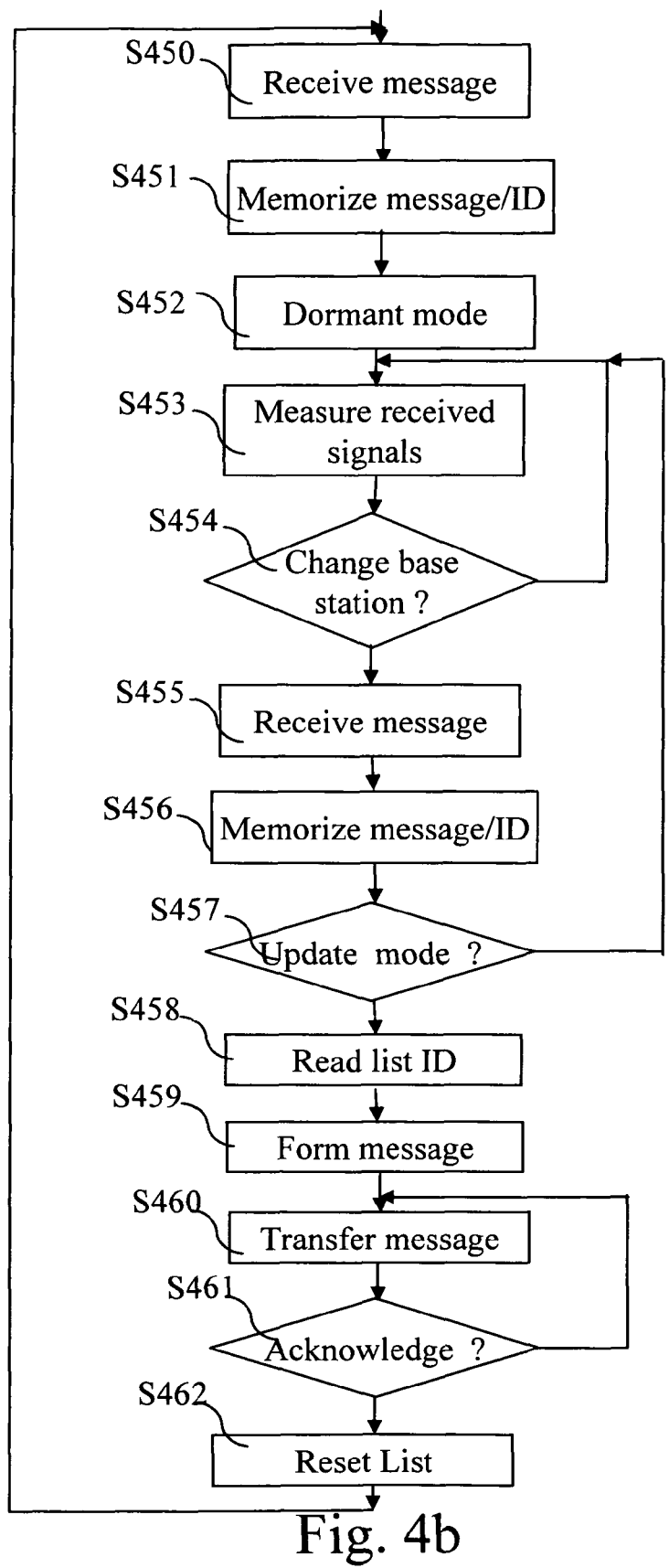
FIG. 4b is an algorithm executed by a mobile terminal according to a second mode of realisation of the present invention.

FIG. 4b is an algorithm executed by a mobile terminal according to a second mode of realisation of the present invention.

The present algorithm is executed by each mobile terminal 130, more precisely by the processor 300 of each mobile terminal 130.

At step S450, the processor 300 detects, through the wireless interface 306, the reception of a message transferred by the base station 110 it is served by. According to the example of the FIG. 1b, the mobile terminal 130 is served by the base station 110a. Such message comprises at least an identifier of the base station 110a which enables other base stations 110 which have a connection with the base station 110a, to identify uniquely the base station 110a which is currently serving the mobile terminal 130. The message comprises also the unique identifier of the mobile terminal 130. Such message comprises preferably a certificate as it has been disclosed in reference to the FIG. 4a.

At next step S451, the processor 300 memorizes the content of the received message in the RAM memory 303.

At next step S452, the processor 300 commands the change of state of the mobile terminal 130. The mobile terminal 30 changes from the active state to the dormant state, i.e. commands the switch off of the transmission part of the wireless interface 306.

At next step S453, the processor 300 commands the wireless interface 306 to proceed to a measure of the power strength of the pilot signals transferred by the base stations 110 which are located in its vicinity. According to the FIG. 1b, the wireless interface 306 measures the power strength of the pilot signals transferred in the cells 115a and 115b of the base stations 110a and 110b.

At next step S454, the processor 300 decides whether or not it has to change of cell 115. According to the example of the FIG. 1b, the power strength of the pilot signals transferred in the cell 115b of the base station 110b is upper than a given threshold, or a given ratio of the power strength of the pilot signals transferred in the cell 115a of the base station 110a which is currently serving the mobile terminal 130, the processor 300 decides to change of cell 115. In that case, the processor 300 moves to step S455.

Otherwise, the processor 300 returns to the step S453 already described.

At step S455, the processor 300 receives a message from the base station 110b. Such message comprises at least an identifier of the base station 110b which enables other base stations 110 which have a connection with the base station 110b, to identify uniquely the base station 110b.

At next step S456, the processor 300 memorises the identifier of the base station 110b in the RAM memory 303. More precisely the processor 300 updates an ordered list which comprises the identifier of the base station 110b followed by the identifier of the base station 110a.

At step S457, the processor 300 checks whether or not the mobile terminal 130 has to change from the dormant state to the active state. Such case occurs when the mobile terminal 130 is in dormant state for a predetermined time period, as example for few seconds, or if the mobile terminal 130 has selected a predetermined number of cells 115, or when it receives a message indicating that data are intended to be transferred to the mobile terminal 130 or is a communication needs to the established with another mobile terminal 130 or with a remote telecommunication device not shown in the FIG. 1b.

If the mobile terminal 130 has to change from the dormant state to the active state, the processor 300 moves to step S458. Otherwise, the processor 300 returns to step S453.

As example, the mobile terminal 130 is maintained in the dormant state.

At step S453, the processor 300 generates a command signal to the wireless interface 306 in order to proceed to a measure of the power strength of the pilot signals transferred by the base stations 110 which are located in its vicinity.

At next step S454, the processor 300 decides whether or not it has to change of cell 115. According to the example of the FIG. 1b, the processor 300 decides to change of cell 115. In that case, the processor 300 moves to step S455.

At step S455, the processor 300 receives a message from the base station 110c. Such message comprises at least an identifier of the base station 110c which enables other base stations 110 which have a connection with the base station 110c, to identify uniquely the base station 110c.

At next step S456, the processor 300 memorises the identifier of the base station 110c in the RAM memory 303. More precisely the processor 300 updates an ordered list which comprises the identifier of the base station 110c followed by the identifier of the base station 110b and by the identifier of the base station 110a.

At next step S457, the processor 300 checks whether or not the mobile terminal 130 has to change from the dormant state to the active state.

As example, the mobile terminal 130 is maintained in the dormant state.

The processor 300 returns then to step S453, selects the cell 115d at step S454, receives at step S455 a message from the base station 110d which comprises at least an identifier of the base station 110d which enables other base stations 110 which have a connection with the base station 110d, to identify uniquely the base station 110d.

At step S456, the processor 300 memorises the identifier of the base station 110d in the RAM memory 303. More precisely the processor 300 updates an ordered list which comprises the identifier of the base station 110d followed by the identifier of the base station 110c, by the identifier of the base station 110b and by the identifier of the base station 110a.

At step S457, the processor 300 checks whether or not the mobile terminal 130 has to change from the dormant state to the active state.

As example, the mobile terminal 130 is maintained in the dormant state.

The processor 300 returns then to step S453, selects the cell 115e at step S454, receives at step S455 a message from the base station 110e which comprises at least an identifier of the base station 110e which enables at least other base stations 110 which have a connection with the base station 110e, to identify uniquely the base station 110e.

At step S456, the processor 300 memorises the identifier of the base station 110e in the RAM memory 303. More precisely the processor 300 updates an ordered list which comprises the identifier of the base station 110e followed by the identifier of the base station 110d, the identifier of the base station 110c, the identifier of the base station 110b and the identifier of the base station 110a.

At next step S457, the processor 300 checks whether or not the mobile terminal 130 has to change from the dormant state to the active state.

As example, the mobile terminal 130 has to change from the dormant state to the active state.

At step S458, the processor 300 reads the list comprising the memorized identifiers of base stations 110.

The list is ordered and comprises the identifiers of the base stations 110 which manage the cells 115 the mobile terminal moved through. The first identifier of the list is the identifier of the base station 110e, the second identifier of the list is the identifier of the base station 110d, the third identifier of the list is the identifier of the base station 110c, the fourth identifier of the list is the identifier of the base station 110b and the last identifier of the list is the identifier of the base station 110a.

At next step S459, the processor 300 forms a message comprising the list read at step S459 and the identifier of the mobile terminal 130.

According to a variant of realization of the present invention, the processor 300 forms a certificate which comprises at least the unique identifier of the mobile terminal 130, the public key of the mobile terminal 130, the read list, the signature of the base station 110 which is serving the mobile terminal 130. The certificate is obtained by encoding the identifier of the mobile terminal 130 and the identifier of the base station 110a which is serving the mobile terminal 130 by the private key of the base station 110a which is currently serving the mobile terminal 130 and the signature of the mobile terminal 130 obtained by encoding these identifiers by the private key of the mobile terminal 130.

It has to be noted here that, the signature of the base station 110a which is currently serving the mobile terminal 130 can also not be comprised in the formed message.

According to another variant of realisation, the formed message is encrypted with the public key of the base station 110, i.e. the base station 110e, that the mobile terminal 130 expects to be served by.

At next step S460, the processor 300 transfers the formed message to the base station 110e it expects to be served by.

It has to be noted here that, each base station 110 of the wireless telecommunication network broadcast signals comprising information enabling mobile terminals 130 to send it a message. The mobile terminal 130 uses such information for the transfer of the message to the base station 110 it expects to be served by.

The processor 300 moves then to step S460 and checks if an acknowledge message ACK is received from the base station 110e it expects to be served by.

If no acknowledgment message is received during a predetermined period of time, the processor 300 returns to step S460.

If an acknowledgment message is received, the processor 300 moves to step S461 and resets the list of base station identifiers memorized at step S451 and S456.

The processor 300 then, returns to step S450 already described.

FIG. 5a is an algorithm executed by a base station according to a first mode of realisation of the present invention.

The present algorithm is executed by each base station 10 of the wireless network, more precisely by the processor 200 of each base station 10.

At step S500, the processor 200 receives, a message.

At next step S501, the processor 200 checks whether or not the message has been sent from a base station 10 or a mobile terminal 30. If the message has been sent from a base station 10, it has been received through the network interface 204. The processor 200 moves then to step S513. Otherwise, the message has been received through the wireless interface 206, and the processor 200 moves to step S502.

At step S502, the processor 200 checks whether or not the received message comprises an identifier of a base station 10. Such identifier of a base station 10 is the identifier of the base station 10 which is currently serving the mobile terminal 30.

If the message doesn't comprise an identifier of a base station 10, it means that the mobile terminal 30 is not served by a base station 10. As example, the mobile terminal 30 has been switched on in the cell 15 of the base station 10 which receives the message and there exists no context yet for that mobile terminal 30 in the wireless telecommunication network.

If the message comprises an identifier of a base station 10, the processor 200 moves to step S506. If the message doesn't comprise an identifier of a base station 10, the processor 200 moves to step S503.

At step S503, the processor 200 gets, from the server 20 the context of the mobile terminal 30 which sent the message. For that, the processor 200 uses the identifier of the mobile terminal 30 comprised in the received message at step S500.

At next step S504, the processor 200 forms a message. Such message comprises at least the identifier of its base station 10. Such message comprises preferably a certificate.

The certificate comprises at least the unique identifier of the mobile terminal 30, the identifier of the base station 10 which received the message, and a signature obtained by encoding these identifiers by the private key of the base station 10 which received the message, i.e. which was expected to serve the mobile terminal 30 and which is now serving the mobile terminal 30.

At next step S505, the processor 200 transfers the message, through the wireless interface 206, to the mobile terminal 30 which sent the message received at step S500. The processor 200 returns then to step S500 and waits for a new message.

If the message received at step S500 comprises an identifier of a base station 10, the processor 200 moves from step S502 to step S506.

At step S506, the processor 200 determines the base station 10 which is currently serving the mobile terminal 30 which sent the message using the base station identifier comprised in the received message.

At next step S507a, the processor 200 processes the received message. The process consists to memorize the content of the received message in the RAM memory 203 or prior to memorize it, to check at step S507b, the integrity of the content of the message if it comprises at least one signature.

If the message comprises the signature of the base station 10, the processor 200 decodes the signature with the public key of the base station 10 of which the identifier is comprised in the message, and determines if the decoded information are identical to the one comprised in the certificate. If information are different, the certificate is corrupted, the processor 200 stops the process and returns to step S500.

It has to be noted here that the public key of the base station 10 of which the identifier is comprised in the message is received from the server 20 at the base station 10 setup or from another base station 10.

If the message comprises the signature of the mobile terminal 30, the processor 200 decodes the signature with the public key of the mobile terminal 30, obtained from the server 20 or the mobile terminal 30 itself, and determines if the decoded information are identical to the one comprised in the certificate. If information are different, the certificate is corrupted, the processor 200 stops the process and returns to step S500.

It has to be noted here that, when the received message comprises two signatures, both above mentioned checks are executed.

By checking the integrity of the message, it is then possible to avoid malicious attacks.

Once the step S507a or the steps S507a and S507b are executed correctly, the processor 200 moves to step S508.

At that step, the processor 200 transfers to the determined base station 10 a message comprising the identifier of the base station 10 which is currently serving the mobile terminal 30, the identifier of the mobile terminal 30, the identifier of its base station 10, i.e. the identifier of the base station 10 which is expected to serve the mobile terminal 30, and the signature of the base station 10 and/or of the mobile terminal 30 if the signature or signatures is or are comprised in the received message at step S500.

At next step S509, the processor 200 receives, from the base station 10 which is currently serving the mobile terminal 30, the context of the mobile terminal 30.

At next step S510, the processor 200 applies the received context for the mobile terminal 30 enabling it to be served by its base station 10.

At next step S511, the processor 200 forms a message.

Such message comprises at least the identifier of its base station 10, i.e. the identifier of the base station 10 which is now serving the mobile terminal 30, the unique identifier of the mobile terminal 30 which sent the message received at step S500. Such message comprises preferably a certificate.

The certificate comprises at least the unique identifier of the mobile terminal 30, the identifier of the base station 10 which is now serving the mobile terminal 30, and a signature obtained by encoding these identifiers by the private key of the base station 10.

At next step S512, the processor 200 transfers through the wireless interface 206 the message previously formed. The content of the message will replace, in the memory 303 of the mobile terminal 30, the content of the message previously received from the previous base station 10 which was serving it.

The processor 200 returns then to step S500 and waits a new message to be processed.

If at step S501, it has been defined that the message received at step S500 is a message transferred by a base station 10, the processor 200 moves to step S513a.

At next step S513a, the processor 200 processes the received message. The process consists to memorize the content of the received message in the RAM memory 203 or prior to memorize it, to check at step S513b, the integrity of the content of the message.

The processor 200 checks if the identifier of the base station 10 which is currently serving the mobile terminal 30 is the same as the identifier of its base station 10, checks if the identifier of the mobile terminal 30 is one of the identifier of the mobile terminals 30 its base station 10 is currently serving. If one of this checks is not correct, the processor 200 stops the process of the message and returns to step S500.

If the message comprises the signature of a base station 10, the processor 200 decodes the signature with its public key and determines if the decoded information are identical to the one comprised in the certificate. If information are different, the certificate is corrupted, the processor 200 stops the process of the message and returns to step S500.

If the message comprises the signature of a mobile terminal 30, the processor 200 decodes the signature with the public key of the mobile terminal 30, obtained from the server 20 or the mobile terminal 30 itself, and determines if the decoded information are identical to the one comprised in the certificate. If information are different, the certificate is corrupted, the processor 200 stops the process and returns to step S500.

Once the step S507a or the steps S513a and S513b are executed correctly, the processor 200 moves to step S514 and reads from the RAM memory 203 the context of the mobile terminal 30 of which the identifier is comprised in the message.

At next step S515, the processor 200 transfers, through the network interface 204, the context of the mobile terminal 30 to the base station 10 which is expected to serve the mobile terminal 30.

The base station 10 stops to serve the mobile terminal 30, the processor 200 deletes the associated context from the RAM memory and returns then to step S500 and waits for a message to be received.

It has to be noted here that, when a base station 10 starts or stops to serves a mobile terminal 30 it informs the server 20.

FIGS. 5b and 5c disclose an algorithm executed by a base station according to a second mode of realisation of the present invention.

The present algorithm is executed by each base station 110 of the wireless network, more precisely by the processor 200 of each base station 110.

At step S530, the processor 200 detects the reception of a message.

At next step S531, the processor 200 checks whether or not the message has been sent from a base station 110 or a mobile terminal 130. If the message has been sent from a base station 110, it has been received through the network interface 204, the processor 200 moves then to step S550. Otherwise, the message has been received through the wireless interface 206 and the processor 200 moves to step S532.

At step S532, the processor 200 checks whether or not the received message comprises a list of identifiers of base stations 110.

If the message comprises a list of identifiers of base stations 110, the processor 200 moves to step S536. If the message doesn't comprise a list of identifiers of base stations 110, the processor 200 moves to step S533.

The steps S533 to S535 are identical to the steps S503 to S505 of the FIG. 5a, they will not be described anymore. Once the step S535 is executed, the processor 200 returns to step S530 and waits for a new message.

If the message received at step S530 comprises a list of identifiers of base stations 110, the processor 200 moves from step S532 to step S536.

The message is as the one transferred at step S460 of the FIG. 4b and is received by the base station 110e.

According to the example disclosed in reference to the FIG. 4b, the list of base station identifiers is ordered and comprises the identifiers of the base stations 110 which manage the cells 115 the mobile terminal 130 moved through. The first identifier of the list is the identifier of the base station 110e, the second identifier of the list is the identifier of the base station 110d, the third identifier of the list is the identifier of the base station 110c, the fourth identifier of the list is the identifier of the base station 110b and the last identifier of the list is the identifier of the base station 110a.

At step S536 the processor 200 checks if they are plural connections which exist with the base stations 110 of which the identifier is comprised in the list of base station identifiers and which have a lower rank in the list than the identifier of the base station 110e.

If they are plural connections, the processor 200 moves to step S538 and selects the identifier of the base station 110 which has the lowest rank in the list of base station identifiers among the identifiers of connected base stations 110.

If there is a single connection established with one base station 110 of which the identifier is comprised in the list of base station identifiers, the processor 200 moves to step S539.

According to the example of the FIG. 1b, the base station 110e is connected only to the base station 110d. The processor 200 moves then to step S539 and selects the identifier of the base station 110d.

At next step S540, the processor 200 processes the received message. The process consists to memorize the content of the received message in the RAM memory 203 or prior to memorize it, to check at step S541, the integrity of the content of the message if it comprises at least one signature.

If the message comprises the signature of the base station 110a, the processor 200 decodes the signature with the public key of the base station 110a of which the identifier is comprised in the message, and determines if the decoded information are identical to the one comprised in the certificate. If information are different, the certificate is corrupted, the processor 200 stops the process and returns to step S530.

If the message comprises the signature of the mobile terminal 130, the processor 200 decodes the signature with the public key of the mobile terminal 130, obtained from the server 120 or the mobile terminal 130 itself, and determines if the decoded information are identical to the one comprised in the certificate. If information are different, the certificate is corrupted, the processor 200 stops the process and returns to step S530.

It has to be noted here that, when the received message comprises two signatures, both above mentioned checks are executed.

By checking the integrity of the message, it is then possible to avoid malicious attacks.

Once the step S540 or the steps S540 and S541 are executed correctly, the processor 200 moves to step S542.

At that step, the processor 200 transfers to the determined base station 110, i.e. the base station 110d, a message comprising the list of base station identifiers, the identifier of the mobile terminal 130, and preferably the signature of the base station 110a and/or of the mobile terminal 130 if the signature or signatures is or are comprised in the received message at step S530.

After that the processor 200 returns to step S530.

If the message received at step S530 has been sent from a base station 110, the processor 200 moves to step S550 and checks whether or not the message comprises the context of a mobile terminal 130.

If the message comprises a context of a mobile terminal 130, the processor 200 moves to step S551. If the message doesn't comprise a context of a mobile terminal 130, the processor 200 moves to step S558.

According to the example, the base station 110d receives the message, the processor 200 of the base station 110d moves to step S558.

At step S558, the processor 200 of the base station 110d checks if the identifier of the base station 110d is the last in the list of base stations identifiers. If the identifier of the base station 110d is the last in the list of base station identifiers, the processor 200 moves to step S559, otherwise, the processor 200 moves to step S554.

According to the example, the identifier of the base station 110d is not the last in the list of base station identifiers, the processor 200 moves to step S554.

At step S554 the processor 200 checks if they are plural connections which exist with the base stations 110 of which the identifier is comprised in the list of base station identifiers and which have a lower rank in the list than the identifier of the base station 110d.

If they are plural connections, the processor 200 moves to step S556, if there is a single connection with a the base station 110 of which the identifier is comprised in the list and which has a lower rank in the list than the identifier of the base station 110d, the processor 200 moves to step S555 selects that identifier and moves to step S557.

According to the example of the FIG. 1b, the base station 110d is connected to the base stations 110c and 110b. The processor 200 moves then to step S556 and selects the identifier of the base station 110 which has the lowest rank in the list of base station identifiers among the identifiers of connected base stations 110, i.e. the identifier of the base station 110b.

At next step S557, the processor 200 transfers to the determined base station, i.e. the base station 110b, a message comprising the list of base station identifiers, the identifier of the mobile terminal 130, and preferably the signature of the base station 110a and/or of the mobile terminal 130 if the signature or signatures is or are comprised in the received message at step S530.

After that, the processor 200 returns to step S530.

The base station 110b receives such message, executes the steps S530, S531, S550, S558, S554 to S557 and transfers to the base station 110a, a message comprising the list of base station identifiers, the identifier of the mobile terminal 130, and preferably the signature of the base station 110a and/or of the mobile terminal 130 if the signature or signatures is or are comprised in the received message.

The base station 110a receives such message, executes the steps S530, S531, S550 and the processor 200 of the base station 110a determines at step S558 that the identifier of the base station 110a is the last in the list of base station identifiers. The processor 200 moves then to step S559.

At next step S559, the processor 200 processes the received message. The process consists to memorize the content of the received message in the RAM memory 203 or prior to memorize it, to check at step S560, the integrity of the content of the message.

The step S560 is identical to the step S507b of the FIG. 5a.

Once the step S559 or the steps S559 and S560 are executed correctly, the processor 200 moves to step S561.

At step S561 the processor 200 checks if they are plural connections which exist with the base stations 110 of which the identifier is comprised in the list of base station identifiers and which have an upper rank in list of base stations identifiers than the one of the base station 110a.

If they are plural connections, the processor 200 moves to step S562, if there is a single connection established with one base station 110 of which the identifier is comprised in the list of base station identifiers and which has a higher rank in the list than the identifier of the base station 110a, the processor 200 moves to step S561 and selects that identifier and moves to step S563.

According to the example of the FIG. 1b, the base station 110a is connected to the base stations 110b and 110c. The processor 200 moves then to step S562 and selects the identifier of the base station 110c which has the highest rank in the list of base station identifiers among the identifiers of the base stations 110d and 110c.

At next step S563, the processor 200 reads from the RAM memory 203 the context of the mobile terminal 130 of which the identifier is comprised in the message.

At next step S564, the processor 200 transfers, through the network interface 204, the context of the mobile terminal 130 to the base station 110c in combination with the list of base station identifiers.

The base station 110a stops to serve the mobile terminal 130, the processor 200 deletes the associated context from the RAM memory 203, returns then to step S530 and waits for a message to be received.

It has to be noted here that, when a base station 110 starts or stops to serves a mobile terminal 130 it informs the server 120.

The base station 110c receives such message, executes the steps S530, S531, and determines at step S550 that the message comprises a context of a mobile terminal 130. The processor of the base station 110c moves then to step S551.

At step S551 the processor 200 of the base station 110c checks if the identifier of the base stations 110c is the first in the list of base station identifiers. If the identifier is the first, the processor 200 moves to step S570, otherwise the processor 200 moves to step S554.

At step S554 the processor 200 checks if they are plural connections which exist with the base stations 110 of which the identifier is comprised in the list of base station identifiers and which have an upper rank than the identifier of the base station 110c.

If they are plural connections, the processor 200 moves to step S556 and selects the identifier of the base station 110 which has the highest rank in the list of base station identifiers among the identifiers of connected base stations 110.

If there is a single connection with a base station 110 of which the identifier is comprised in the list of base station identifiers and which has a higher rank in the list than the identifier of the base station 110c the processor 200 moves to step S555.

According to the example of the FIG. 1b, the base station 110c is connected to the base station 110d of which the identifier comprised in the list of base station identifiers and which has a higher rank in the list of base station identifiers than the identifier of the base station 110c. The processor 200 moves then to step S555 and selects the identifier of the base station 110d At next step S557, the processor 200 transfers to the determined base station, i.e. the base station 110d, a message comprising the list of base station identifiers, the identifier of the mobile terminal 130 and the context of the mobile terminal 130.

After that, the processor 200 returns to step S530.

The base station 110d receives such message, executes the steps S530, S531, S550, S551, S554 to S557 and transfers to the base station 110e, a message comprising the list of base station identifiers, the identifier of the mobile terminal 130 and the context of the mobile terminal 130.

The base station 110e receives such message, the processor 200 of the base station 110e executes the steps S530, S531, S550 and determines at step S551 that the identifier of the base station 110e is the first in the list of base station identifiers.

The processor 200 of the base station 110e moves then to step S570.

At step S570, the processor 200 reads the context of the mobile terminal 130 in the received message.

At step S571, the processor 200 applies the received context for the mobile terminal 130 enabling it to be served by the base station 110e.

At next step S572, the processor 200 commands the transfer of an acknowledgment message to the mobile terminal 130.

At next step S573, the processor 200 forms a message. Such message comprises at least the identifier of its base station 110, i.e. the identifier of the base station 110e which is now serving the mobile terminal 130, the unique identifier of the mobile terminal 130. Such message comprises preferably a certificate.

The certificate comprises at least the unique identifier of the mobile terminal 130, the identifier of the base station 110e which is now serving the mobile terminal 130, and a signature obtained by encoding these identifiers by the private key of the base station 110e.

At next step S574, the processor 200 transfers through the wireless interface 206 the message previously formed. The content of the message will replace, in the memory 303 of the mobile terminal 130, the content of the message previously received from the previous base station 110a which was serving it.

The processor 200 returns then to step S530 and waits a new message to be processed.

It has to be noted here that either in the first and second modes of realisation of the present invention, the identifiers of bases stations are identifiers of the base stations or identifiers of the cell or cells managed by base stations 110.

It has to be noted here that, the list of base station identifiers are ordered from the most recently selected base station 110 to the oldest selected base station 110 but the list of base station identifiers can be also ordered from oldest selected base station 110 to the most recently selected base station 110. In such case, instead of determining the identifier or identifiers which has or have a lower rank, the processor 200 determines the identifier or identifiers which has or have a higher rank. On the same way, instead of determining the identifier or identifiers which has or have a higher rank, the processor 200 determines the identifier or identifiers has or have a lower rank. Instead of determining if the identifier of the base station is the last in the list, the processor 200 determines if the identifier of the base station is the first in the list and instead of determining if the identifier of the base station is the first in the list, the processor 200 determines if the identifier of the base station is the last in the list.

Naturally, many modifications can be made to the embodiments of the invention described above without departing from the scope of the present invention.

The invention claimed is:

1. A method for requesting a base station to serve a mobile terminal, the base station being a base station of a wireless telecommunication network, the mobile terminal being served by another base station of the wireless telecommunication network, wherein the method, executed by the mobile terminal which requests to be served by the base station, comprises:
- receiving from the base station by which the mobile terminal is currently being served, a first message comprising at least an identifier of the base station by which the mobile terminal is currently being served, and an identifier of the mobile terminal;
- transferring to the base station the mobile terminal requests to be served by, a second message comprising at least the identifier of the base station by which the mobile terminal is currently being served, and the identifier of the mobile terminal;
- selecting third base stations;
- memorizing the identifiers of the selected base stations; and
- configuring the mobile terminal in a first state wherein the transfer of signals is interrupted, wherein,
- the second message comprises the identifiers of the base stations ordered according to the order of which the mobile terminal has selected the base stations, and
- the third base stations are selected when the mobile terminal is configured in the state wherein the transfer of signals is interrupted.

2. The method according to claim 1, wherein the first message comprises a certificate which comprises the identifier of the mobile terminal, the identifier of the base station and a signature obtained by encoding the identifiers by the private key of the base station the mobile terminal is currently being served.

3. The method according to claim 2, wherein the second message comprises a certificate which comprises the identifier of the mobile terminal, the identifier of the base station and a signature obtained by encoding the identifiers by the private key of the other base station and/or a signature obtained by encoding the identifiers by the private key of the mobile terminal.

4. The method according to claim 3, wherein the method further comprises:
- receiving from the base station which is requested to serve the mobile terminal, a third message comprising at least an identifier of the base station which is requested to serve the mobile terminal and an identifier of the mobile terminal.

5. The method according to claim 1, wherein the method further comprises:
- determining the number of selected third base stations; and
- configuring the mobile terminal in a second state in which the transfer of signals is enabled if the determined number is equal to a predetermined value.

6. The method according to claim 5, wherein the second message is transferred once the mobile terminal is configured in the second state.

7. A device for requesting a base station to serve a mobile terminal, the base station being a base station of a wireless telecommunication network, the mobile terminal being served by another base station of the wireless telecommunication network, wherein the device is comprised in the mobile terminal which requests to be served by the base station, and comprises:
- a device configured to receive from the base station by which the mobile terminal is currently being served at least an identifier of the base station the mobile terminal is currently being served and an identifier of the mobile terminal;
- a device configured to transfer to the base station the mobile terminal requests to be served by, a message comprising at least the identifier of the base station by which the mobile terminal is currently being served and the identifier of the mobile terminal;
- a device configured to select third base stations;
- a device configured to memorize the identifiers of the selected base stations; and
- a device configured to configure the mobile terminal in a first state wherein the transfer of signals is interrupted, wherein,
- the second message comprises the identifiers of the base stations ordered according to the order of which the mobile terminal has selected the base stations, and
- the third base stations are selected when the mobile terminal is configured in the state wherein the transfer of signals is interrupted.

8. A non-transitory computer readable media which can be directly loadable into a programmable device, comprising instructions or portions of code for implementing the method according to any of claim 1 to 4, 5, 6 or 7, when said instructions or portions of code are executed on the programmable device.

* * * * *